United States Patent
P et al.

(10) Patent No.: US 9,710,516 B2
(45) Date of Patent: Jul. 18, 2017

(54) GHOST TABLE JOINS IN REMOTE SYSTEMS

(71) Applicants: Shahul Hameed P, Sunnyvale, CA (US); George Quaye, San Leandro, CA (US); Sudipto Chowdhuri, Dublin, CA (US); Santosh Pendap, Dublin, CA (US)

(72) Inventors: Shahul Hameed P, Sunnyvale, CA (US); George Quaye, San Leandro, CA (US); Sudipto Chowdhuri, Dublin, CA (US); Santosh Pendap, Dublin, CA (US)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 14/277,284

(22) Filed: May 14, 2014

(65) Prior Publication Data

US 2015/0331912 A1 Nov. 19, 2015

(51) Int. Cl.
 *G06F 17/30* (2006.01)
(52) U.S. Cl.
 CPC .. *G06F 17/30498* (2013.01); *G06F 17/30339* (2013.01); *G06F 17/30454* (2013.01); *G06F 17/30595* (2013.01); *G06F 17/30864* (2013.01)
(58) Field of Classification Search
 CPC ......... G06F 17/30498; G06F 17/30339; G06F 17/30454; G06F 17/30864
 See application file for complete search history.

(56) References Cited

U.S. PATENT DOCUMENTS

| | | | | |
|---|---|---|---|---|
| 7,092,954 B1* | 8/2006 | Ramesh | ............ | G06F 17/30498 707/714 |
| 7,539,660 B2* | 5/2009 | Focazio | ............ | G06F 17/30454 |
| 7,720,846 B1* | 5/2010 | Bayliss | ............. | G06F 17/30598 707/736 |
| 7,945,562 B2* | 5/2011 | Ahmed | ............ | G06F 17/30466 707/718 |
| 2009/0063527 A1* | 3/2009 | Corvinelli | ......... | G06F 17/30466 |
| 2009/0248710 A1* | 10/2009 | McCormack | ..... | G06F 17/30604 |
| 2010/0082671 A1* | 4/2010 | Li | .................... | G06F 17/30498 707/770 |
| 2012/0310917 A1* | 12/2012 | Sheinin | ............. | G06F 17/30501 707/714 |
| 2012/0310918 A1* | 12/2012 | Johri | ................. | G06F 17/30457 707/714 |
| 2012/0317093 A1* | 12/2012 | Teletia | .............. | G06F 17/30498 707/714 |

(Continued)

*Primary Examiner* — Huawen A Peng
(74) *Attorney, Agent, or Firm* — Buckley, Maschoff & Talwalkar LLC

(57) ABSTRACT

A system includes reception of a client query including a JOIN between a local database table of a first computing system and a remote table of a second computing system, transmission of an instruction to the second computing system to define a new table in the second computing system, the new table associated with a storage handler for retrieving data of the local database table, generation of a remote query of the second computing system, the remote query including a second JOIN between the new table and the remote table, transmission of the remote query to the second computing system, and reception of results of the remote query from the second computing system.

22 Claims, 6 Drawing Sheets

(56) References Cited

U.S. PATENT DOCUMENTS

| | | | |
|---|---|---|---|
| 2012/0330923 A1* | 12/2012 | Modi | G06F 17/30442 707/714 |
| 2013/0018902 A1* | 1/2013 | Vickers | G06F 8/51 707/756 |
| 2013/0151502 A1* | 6/2013 | Yoon | G06F 17/30315 707/714 |
| 2014/0280022 A1* | 9/2014 | Jagtap | G06F 17/30466 707/714 |
| 2014/0280024 A1* | 9/2014 | Baskett | G06F 17/30498 707/714 |

* cited by examiner

GHOST TABLE JOINS IN REMOTE SYSTEMS

BACKGROUND

Conventional database management systems provide stored data to client applications upon request. The data may be stored in local disks and/or local volatile memory (e.g., Random Access Memory) in order to enable fast access thereto. Some database management systems are also capable of pulling data from remote (and typically large-scale) data sources and providing this data to client applications.

A client application may request a dataset which includes local data and remote data. In order to respond to such a request, a conventional system may pull all of the remote data into its local file system, perform any required JOINS, and select the requested dataset. Alternatively, the local data may be moved to the remote data source, where the JOIN occurs and the dataset is selected.

Neither of the foregoing approaches is suitable in some cases. For example, if the remote data is large, the first approach may overwhelm the local system. The second approach presents difficulties if the remote data source is not equipped to efficiently handle disk-persisted table inserts.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
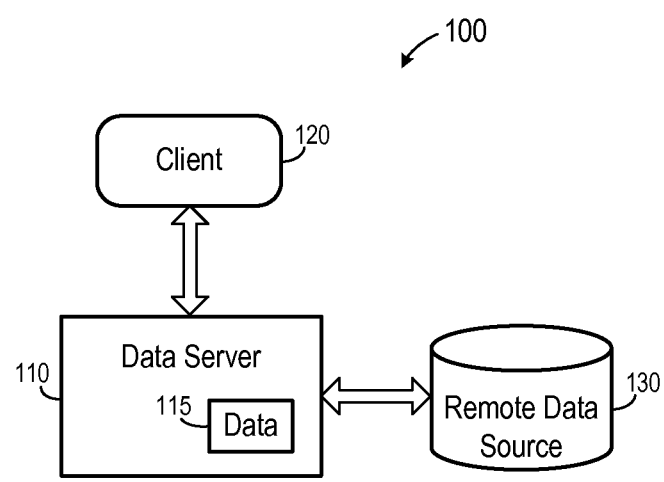
FIG. 1 is a block diagram of a system according to some embodiments.

FIG. 1 is a block diagram of system 100 according to some embodiments. System 100 includes data server 110, client 120, and remote data source 130. Generally, data server 110 receives queries from client 120 and provides results to client 120 based on data of data 115 and/or remote data source 130. Data server 110 may support multi-tenancy to separately support multiple unrelated clients by providing multiple logical database systems which are programmatically isolated from one another.

Data 115 may be stored in Random Access Memory (e.g., cache memory for storing recently-used data) and one or more fixed disks (e.g., persistent memory for storing their respective portions of the full database). Alternatively, data server 110 may implement an "in-memory" database, in which data 115 is a full database stored in volatile (e.g., non-disk-based) memory (e.g., Random Access Memory).

In some embodiments, data 115 may comprise one or more of conventional tabular data, row-based data, column-based data, and object-based data. Moreover, the data of data source 110 may be indexed and/or selectively replicated in an index to allow fast searching and retrieval thereof.

Client 120 may comprise one or more devices executing program code of a software application for presenting user interfaces to allow interaction with data server 110. For example, a user may manipulate such user interfaces to request particular data (e.g., for populating a spreadsheet, a graph, etc.). In response, client 120 executes program code of a software application to generate a query (e.g., a structured-query language (SQL) query) identifying the requested data, and to transmit the query to data server 110.

Presentation of a user interface may comprise any degree or type of rendering. For example, client 120 may execute a Web Browser to receive a Web page (e.g., in HTML format) from data server 110, and may render and present the Web page according to known protocols. Client 120 may also or alternatively present user interfaces by executing a stand-alone executable file (e.g., an .exe file) or code (e.g., a JAVA applet) within a virtual machine. System 100 may include any number of clients 120 of one or more types according to some embodiments.

Remote data source 130 may comprise any query-responsive data source or sources that are or become known, including but not limited to a structured-query language (SQL) relational database management system. Remote data source 130 may comprise a relational database, a multi-dimensional database, an eXtendable Markup Language (XML) document, or any other data storage system storing structured and/or unstructured data. The data of remote data source 130 may be distributed among several relational databases, dimensional databases, and/or other data sources. Embodiments are not limited to any number or types of data sources. For example, remote data source 130 may comprise one or more OnLine Analytical Processing (OLAP) databases, spreadsheets, text documents, presentations, etc.

According to some embodiments, remote data source 130 may comprise a distributed file system. For example, remote data source 130 may comprise a distributed file system for use by data-intensive distributed applications, such as that provided by Apache Hadoop. In this regard, remote data source 130 may also comprise an SQL interface to the distributed file system, such as Apache Hive.

Figure 2:
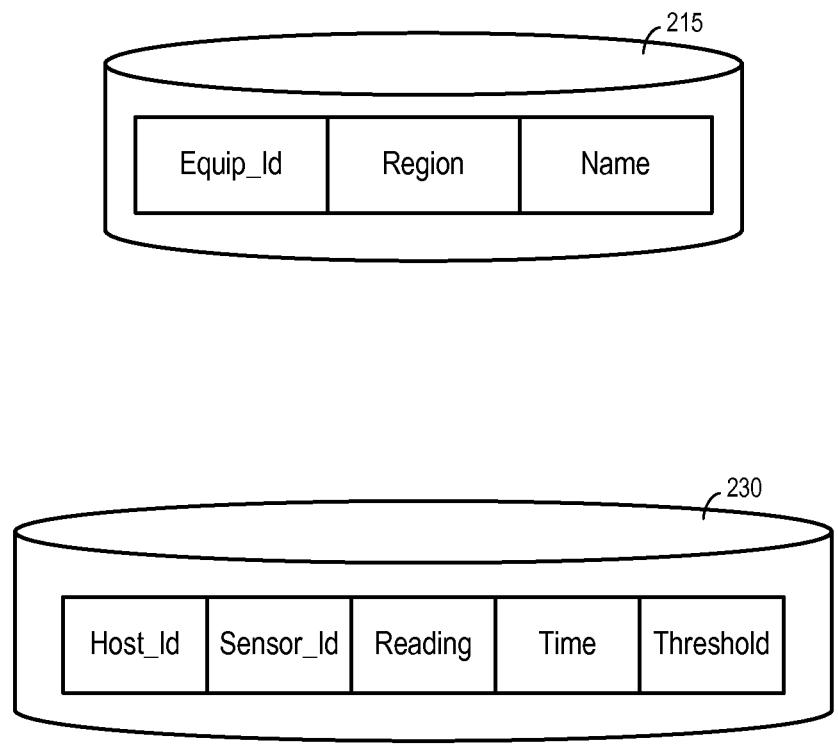
FIG. 2 illustrates columns of a local database table and a remote database table according to some embodiments.

FIG. 2 illustrates local database table 215 and remote table 230 according to some embodiments. For purposes of example, table 215 may be stored within data 115 of data server 110 and table 230 may be stored in remote data source 130. Embodiments are not limited to system 100.

According to some embodiments, table 230 is defined by a schema and a storage handler within remote data source 130. The schema defines the structure of table 230 and the storage handler is responsible for retrieving and de-serializing the table content (i.e., writing), and for serializing and storing the table content (i.e., reading). The location of the data of table 230 is transparent to remote data source 130 because reading and writing is controlled by its associated storage handler.

According to the present example, local table 215 includes columns Equip_Id, Region, and Name. Table 215 therefore includes basic equipment information, with each row identifying an ID, a location, and a name of a unit of equipment.

Remote table 230 includes columns Host_Id, Sensor_Id, Reading, Time and Threshold. Remote table 230 is therefore used to store sensor readings associated with units of equipment (i.e., hosts). Each row of remote table 230 is associated with a single reading of a single sensor of a single host. Accordingly, remote table 230 is likely much larger than local database table 215 and exhibits a much greater data velocity. Embodiments are not limited to a local database table and a remote table having such size and velocity relationships.

Figure 3:
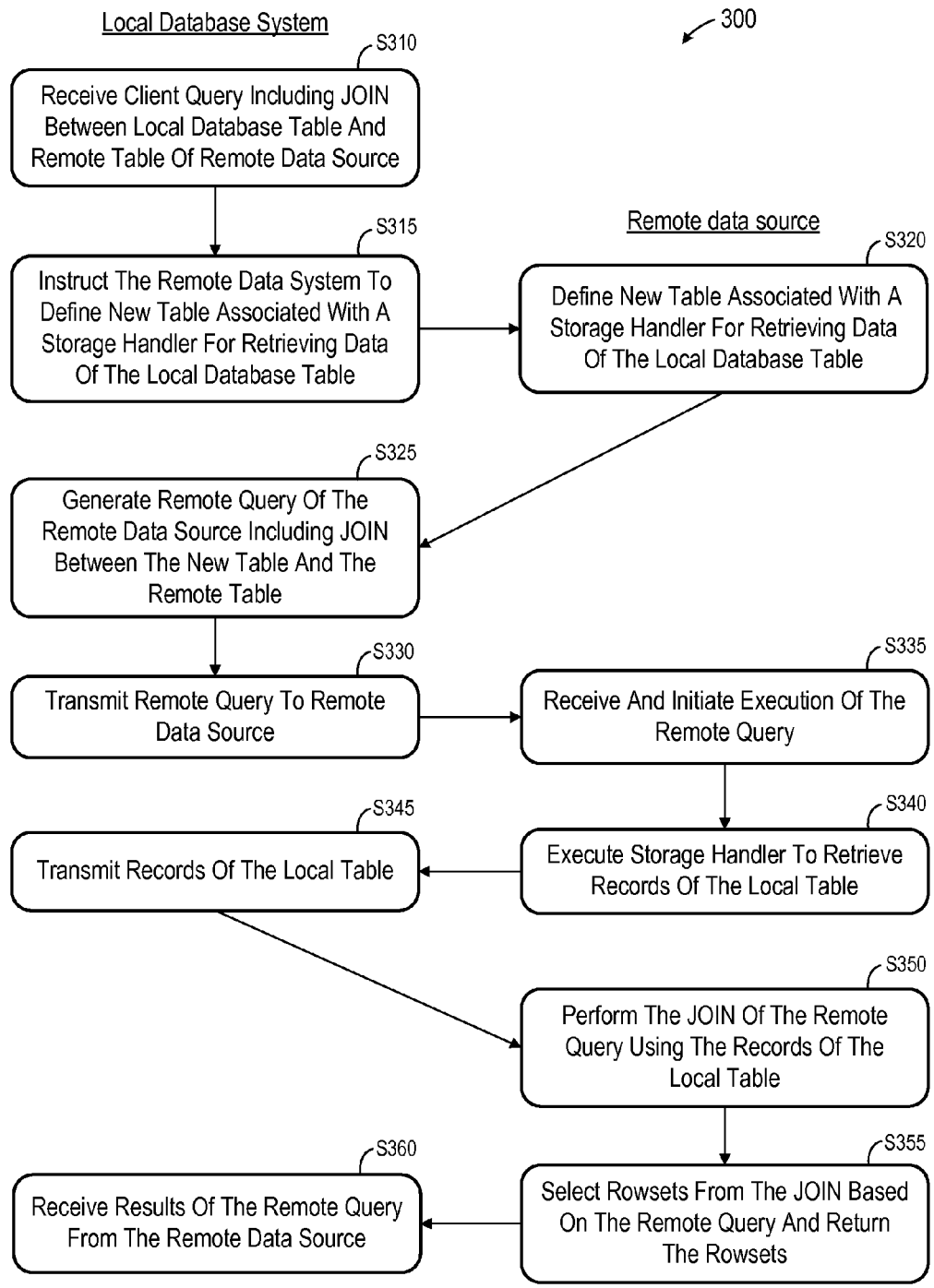
FIG. 3 is a flow diagram of a process according to some embodiments.

FIG. 3 comprises a flow diagram of process 300 according to some embodiments. In some embodiments, various hardware elements of data server 110 and remote data source 130 (e.g., one or more processors) execute program code to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a client query is received at S310. The client query requests a combination of local data from a local database table and remote data from a remote data source. The client query might also include operators indicating how the selected remote data and local data are to be combined into a result set. With reference to FIG. 1, data server 110 may receive the client query at S310 from client 120 according to some embodiments. Referring to FIG. 2, the client query may request data from local database table 215 and remote table 230.

The received client query includes a JOIN between the local database table and the remote table of the remote data source. Continuing the present example, the following query may be received at S310, where table 215 is named HANA_EQUIPMENT and table 230 is named HIVE_SENSOR_RECORDS:

SELECT*FROM HANA_EQUIPMENT EQUIP
  JOIN HIVE_SENSOR_RECORDS SENSOR
  ON EQUIP.ID=SENSOR.HOST_ID WHERE
  EQUIP.REGION='NA' AND
  SENSOR.READING>SENSOR.THRESHOLD

The above query is a Structured Query Language (SQL)-formatted query, but a client query according to some embodiments may be formatted in any query language that is or becomes known.

Data server 110 identifies the JOIN of local and remote data within the query and, in response, instructs the remote data source to define a new table associated with a storage handler for retrieving data of the local database table. According to some embodiments, the instruction and the definition include a query which may be used by the remote data source to retrieve the data of the local table from the local database system. The query may include security information, such as authorization tokens.

For example, the instruction may be an SQL statement which is transmitted from data server 110 to remote data source 130, such as the following:

CREATE EXTERNAL TABLE HIVE_GHOST_E-
  QUIP (EQUIP_ID INTEGER) STORED BY
  'com.sap.hadoop.GhostHandler'TBLPROPERTIES
  (host=hana.host, port=30015,
  auth_token="generated_token/Kerberos princi-
  pal", ETLQuery=SELECT EQUIP_ID FROM
  HANA_EQUIPMENTS where REGION='NA')

The above statement passes a query (i.e., ETLQuery) to retrieve the data of the local table through the TBLPROPERTIES parameter. Also passed through TBLPROPERTIES are host and port information and an authorization token.

Figure 4:
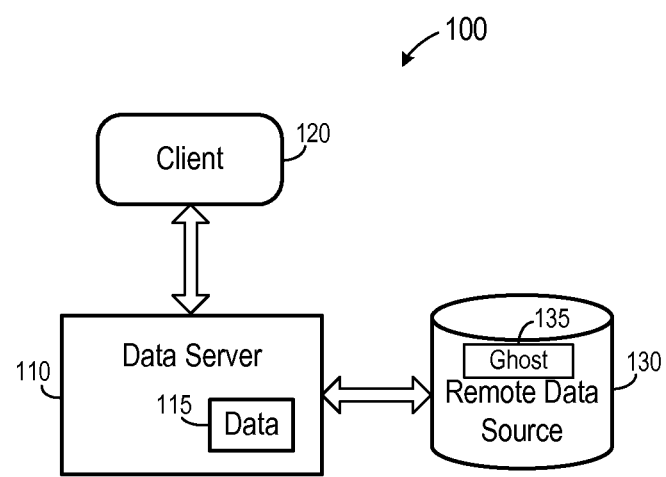
FIG. 4 illustrates execution of the FIG. 3 process according to some embodiments.

The statement is received by the remote data source and, at S320, a new table is defined in the remote data source. The schema of the new table may be identical to the schema of the local database table (e.g., table 215), and the new table is associated with a storage handler for retrieving data of the local database table. According to some embodiments, the new table is not written to or otherwise persisted in any file system of the remote data source. FIG. 4 depicts new table 135 defined in remote data source 130 according to some embodiments.

The local database system then generates a remote query of the remote data source at S325. The remote query includes a JOIN between the new table created at S320 and the remote tale of the client query. The remote query is generated based on the dialect and operators supported by the query interface of the remote data source.

Based on the client query of the current example, data server 110 may generate the following query at S325 according to some embodiments, where the new table is named HIVE_GHOST_EQUIP:

SELECT*FROM HIVE_GHOST_EQUIP EQUIP
  JOIN HIVE_SENSOR_RECORDS SENSOR
  ON EQUIP.ID=SENSOR.HOST_ID WHERE
  EQUIP.REGION='NA' AND
  SENSOR.READING>SENSOR.THRESHOLD

The remote query is transmitted to the remote data source at S330. The remote data source receives the query and initiates execution of the remote query at S335. First, the reading of the new table is delegated to the storage handler associated with the new table and the storage handler is executed at S340.

The storage handler reads the properties of the new table and fires the query specified in the properties. Continuing the above example, the following query is transmitted to the local system from the remote data source at S340: SELECT EQUIP_ID FROM HANA_EQUIPMENTS where REGION='NA'.

In response to the query, the records of the local table are transmitted from the local database system to the remote data source via at S345. According to some embodiments, S345 includes transmission of the records of the local database table to the remote data source via the Open Database Connectivity (ODBC) protocol or a low level (e.g., TCP/IP-based) protocol.

The new table and the remote table are then JOINed at S350 as specified in the remote query received at S335. The JOIN may occur in volatile memory of the remote data source, so that no disk operations are require for insertion of the records received from the local system.

Also based on the remote query, rowsets are selected from the JOIN and returned to the local database system at S355. The rowsets are received by the local database system at S360.

Figure 5:
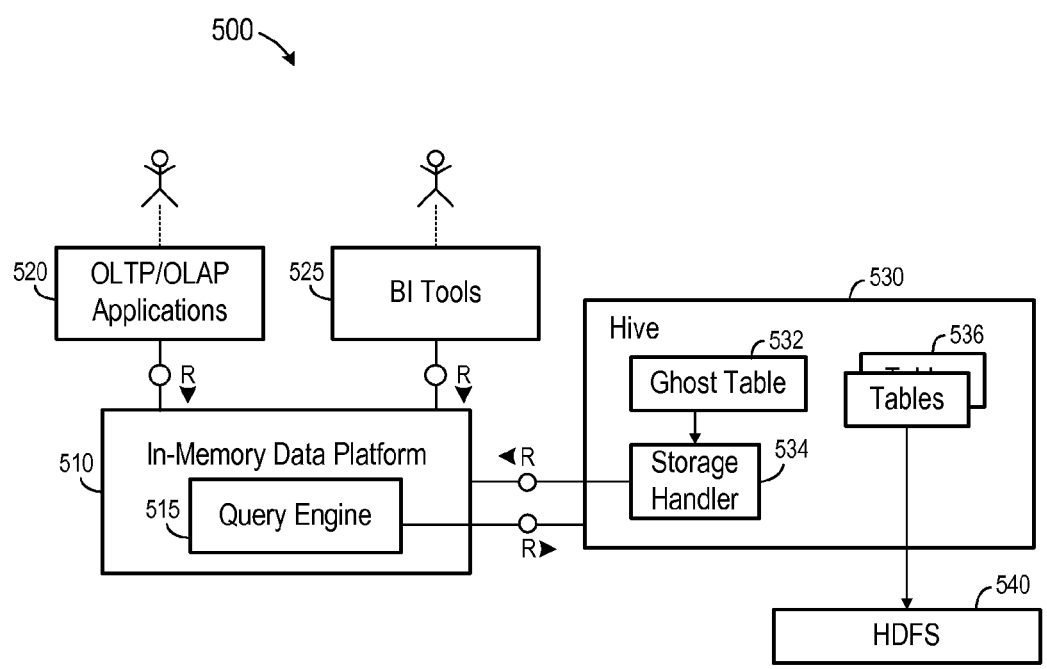
FIG. 5 is a block diagram of a system according to some embodiments.

FIG. 5 is a detailed block diagram of system 500 according to some embodiments. System 500 may comprise an implementation of system 100 and, as such, the elements of system 500 may execute process 300 according to some embodiments.

In-memory data platform 510 includes query engine 515, which is capable of accessing data not otherwise stored in volatile memory of platform 510. In some embodiments, query engine 515 may comprise program code executable to cause performance of S310, S315, S325, S330, S345 and S365 of process 300. As described above, access to remote data may be required in response to queries received from client applications such as OnLine Transaction Processing/ OnLine Analytical Processing applications 520 and Business Intelligence tools 525.

Remote data source 530 comprises a Hadoop/Hive data source as described above. Remote data source 530 may comprise any type of data source, including but not limited to a conventional database management system. Hive component 531 is a query interface to underlying Hadoop File System 538. Query engine 515 may communicate with each of remote data source 430 via ODBC drivers.

Ghost table 532 and storage handler 534 correspond to the new table and storage handler described with respect to process 300. As shown, storage handler 534 is defined to retrieve data for ghost table 532 from data platform 510. In contrast, tables 536 of remote data source 530 are persisted in Hadoop File System 538 and their data is retrieved therefrom when needed.

Figure 6:
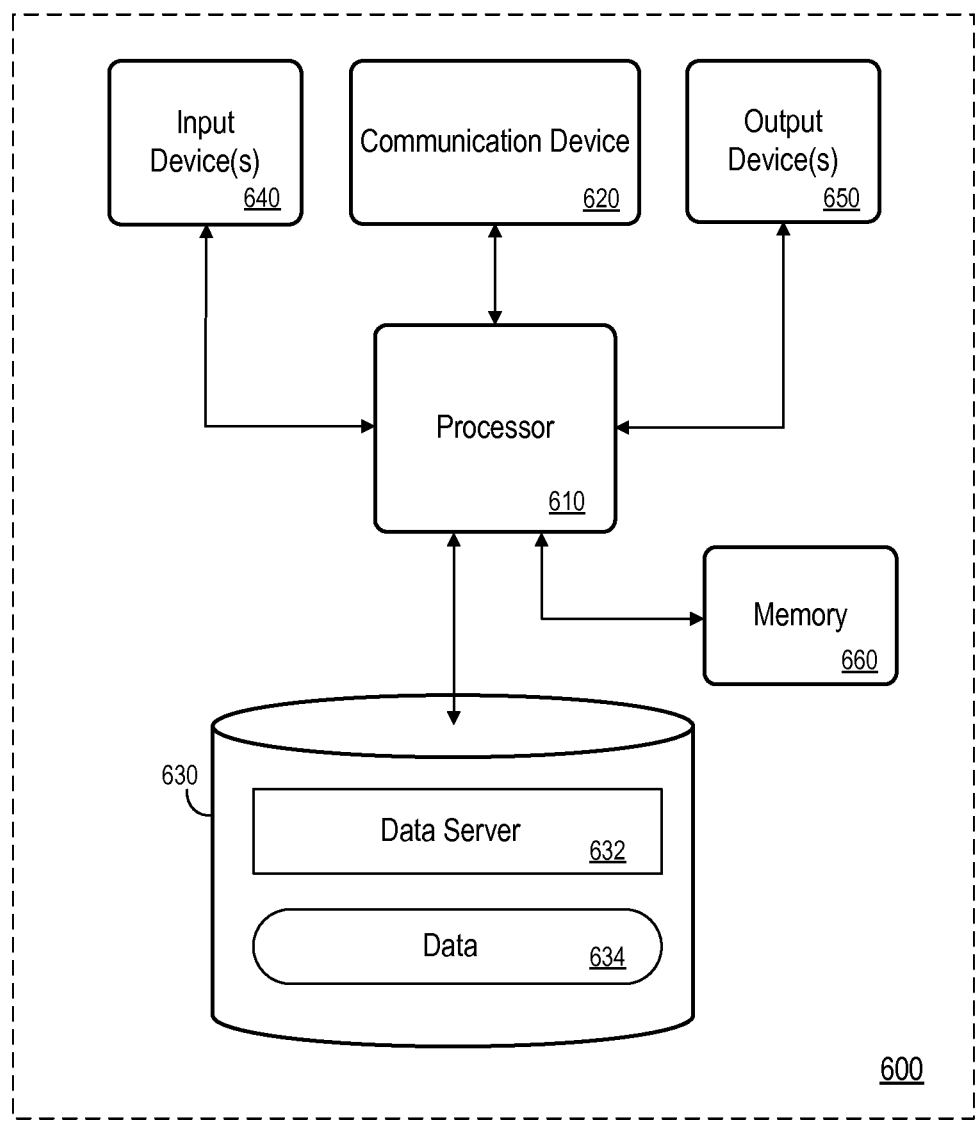
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of data server 110 in some embodiments. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Data server 632 may comprise program code executed by processor 610 to cause apparatus 600 to perform any one or more of the processes described herein. Embodiments are not limited to execution of these processes by a single apparatus. Data may include conventional database data as described above. As also described above, database data (either cached or a full database) may be stored in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first computing system comprising:
 a first data storage device storing a local database table comprising a plurality of columns and defined by a first schema;
 a first memory storing first processor-executable program code; and
 a first processor to execute the first processor-executable program code in order to cause the first computing system to:
 receive a client query including a JOIN between the local database table and a remote table of a second computing system;
 transmit an instruction comprising (i) a create table statement and (ii) a select statement to the second computing system to define a new table in the second computing system based on the create table statement, the new table comprising the plurality of columns and defined by the first schema, wherein the new table is associated with a storage handler for retrieving data of the local database table and wherein the select statement is for retrieving data from the local database table;
 generate a remote query of the second computing system, the remote query including a second JOIN between the new table and the remote table;
 transmit the remote query to the second computing system; and
 receive results of the remote query from the second computing system.

2. A system according to claim 1, further comprising the second computing system, the second computing system comprising:
 a second memory storing second processor-executable program code; and
 a second processor to execute the second processor-executable program code in order to cause the second computing system to:
 define the new table associated with the storage handler for retrieving data of the local database table;
 execute the storage handler to retrieve data of the local table;
 perform the second JOIN between the new table and the remote table;
 select rowsets from the second JOIN based on the remote query; and
 return the rowsets to the first computing system as the results of the remote query.

3. A system according to claim 2, wherein transmission of the instruction to the second computing system to define the new table in the second computing system comprises:
generation of a query to retrieve data of the local database table; and
generation of the instruction,
wherein the instruction includes the query.

4. A system according to claim 3, wherein the query includes a table properties parameter, and
wherein the table properties parameter includes the query.

5. A system according to claim 4, wherein the table properties parameter includes an authorization token to authorize access of the data of the local database table.

6. A system according to claim 3, wherein execution of the storage handler to retrieve data of the local table comprises:
transmitting the query to the first computing system.

7. A system according to claim 1, wherein transmission of the instruction to the second computing system to define the new table in the second computing system comprises:
generation of a query to retrieve data of the local database table; and
generation of the instruction,
wherein the instruction includes the query.

8. A system according to claim 7, wherein the query includes a table properties parameter, and
wherein the table properties parameter includes the query and an authorization token to authorize access of the data of the local database table.

9. A computer-implemented method, comprising:
receiving a client query including a JOIN between a local database table of a first computing system and a remote table of a second computing system, the local database table comprising a plurality of columns and defined by a first schema;
transmitting an instruction comprising (i) a create table statement and (ii) a select statement to the second computing system to define a new table in the second computing system based on the create table statement, the new table comprising the plurality of columns and defined by the first schema, wherein the new table is associated with a storage handler for retrieving data of the local database table and wherein the select statement is for retrieving data from the local database table;
generating a remote query of the second computing system, the remote query including a second JOIN between the new table and the remote table;
transmitting the remote query to the second computing system; and
receiving results of the remote query from the second computing system.

10. A computer-implemented method according to claim 9, further comprising:
defining the new table in the second computing system, the new table associated with the storage handler for retrieving data of the local database table;
executing the storage handler in the second computing system to retrieve data of the local table;
performing the second JOIN between the new table and the remote table in the second computing system;
selecting rowsets from the second JOIN based on the remote query in the second computing system; and
returning the rowsets to the first computing system as the results of the remote query.

11. A computer-implemented method according to claim 10, wherein transmitting the instruction to the second computing system to define the new table in the second computing system comprises:
generating a query to retrieve data of the local database table; and
generating the instruction,
wherein the instruction includes the query.

12. A computer-implemented method according to claim 11, wherein the query includes a table properties parameter, and
wherein the table properties parameter includes the query.

13. A computer-implemented method according to claim 12, wherein the table properties parameter includes an authorization token to authorize access of the data of the local database table.

14. A computer-implemented method according to claim 11, wherein executing the storage handler to retrieve data of the local table comprises:
transmitting the query to the first computing system.

15. A computer-implemented method according to claim 9, wherein transmitting the instruction to the second computing system to define the new table in the second computing system comprises:
generating a query to retrieve data of the local database table; and
generating the instruction,
wherein the instruction includes the query.

16. A computer-implemented method according to claim 15, wherein the query includes a table properties parameter, and
wherein the table properties parameter includes the query and an authorization token to authorize access of the data of the local database table.

17. A non-transitory computer-readable medium storing program code, the program code executable by a first processor of a first computing system to cause the first computing system to:
receive a client query including a JOIN between a local database table of a first computing system and a remote table of a second computing system, the local database table comprising the plurality of columns and defined by a first schema;
transmit an instruction comprising (i) a create table statement and (ii) a select statement to the second computing system to define a new table in the second computing system based on the create table statement, the new table comprising the plurality of columns and defined by the first schema, wherein the new table is associated with a storage handler for retrieving data of the local database table and wherein the select statement is for retrieving data from the local database table;
generate a remote query of the second computing system, the remote query including a second JOIN between the new table and the remote table;
transmit the remote query to the second computing system; and
receive results of the remote query from the second computing system.

18. A non-transitory computer-readable medium according to claim 17, further comprising program code executable by a second processor of the second computing system to cause the second computing system to:
define the new table, the new table associated with the storage handler for retrieving data of the local database table;
execute the storage handler to retrieve data of the local table;
perform the second JOIN between the new table and the remote table;

select rowsets from the second JOIN based on the remote query; and return the rowsets to the first computing system as the results of the remote query.

19. A non-transitory computer-readable medium according to claim 18, wherein transmission of the instruction to the second computing system to define the new table in the second computing system comprises:

generation of a query to retrieve data of the local database table; and generation of the instruction, wherein the instruction includes the query.

20. A non-transitory computer-readable medium according to claim 19, wherein the query includes a table properties parameter, and wherein the table properties parameter includes the query and an authorization token to authorize access of the data of the local database table.

21. A non-transitory computer-readable medium according to claim 19, wherein execution of the storage handler to retrieve data of the local table comprises:

transmission of the query to the first computing system.

22. A non-transitory computer-readable medium according to claim 17, wherein transmission of the instruction to the second computing system to define the new table in the second computing system comprises:

generation of a query to retrieve data of the local database table; and generation of the instruction, wherein the instruction includes the query.

* * * * *